(12) United States Patent
Tuilier

(10) Patent No.: US 7,107,067 B2
(45) Date of Patent: Sep. 12, 2006

(54) METHOD FOR DETECTION OF SATURATION OF FILES OR APPLICATIONS IN A SIM CARD FOR A MOBILE COMMUNICATION DEVICE

(75) Inventor: Edmond Tuilier, Marseilles (FR)

(73) Assignee: Gemplus, Gemenos Cedex (FR)

( * ) Notice: Subject to any disclaimer, the term of this patent is extended or adjusted under 35 U.S.C. 154(b) by 0 days.

(21) Appl. No.: 10/479,172

(22) PCT Filed: May 31, 2002

(86) PCT No.: PCT/FR02/01857

§ 371 (c)(1),
(2), (4) Date: May 27, 2004

(87) PCT Pub. No.: WO02/104052

PCT Pub. Date: Dec. 27, 2002

(65) Prior Publication Data
US 2004/0209630 A1 Oct. 21, 2004

(30) Foreign Application Priority Data
May 31, 2001 (FR) ................................ 01 07143

(51) Int. Cl.
*H04Q 7/20* (2006.01)
(52) U.S. Cl. ...................... 455/466; 455/558; 455/418; 455/419; 455/458; 455/412; 455/413; 455/414
(58) Field of Classification Search ............... 455/466, 455/558, 418, 419, 458, 412, 413, 414
See application file for complete search history.

(56) References Cited

FOREIGN PATENT DOCUMENTS

| WO | 98 00994 | 1/1998 |
|---|---|---|
| WO | 00 31997 | 6/2000 |
| WO | 00 40048 | 7/2000 |

*Primary Examiner*—Joseph Feild
*Assistant Examiner*—David Q. Nguyen
(74) *Attorney, Agent, or Firm*—Buchanan Ingersoll & Rooney PC

(57) ABSTRACT

The invention relates to a method for detection of saturation of files or applications in a mobile communication device (10) connected to a remote control center (12) and a message server SMS-SC (14), characterised in comprising the following principal steps: (a) detection of a data file (38) or data application contained in a SIM card (16), the free space of which is below a certain threshold and (b) generation of an alarm signal after said threshold is reached.

7 Claims, 1 Drawing Sheet

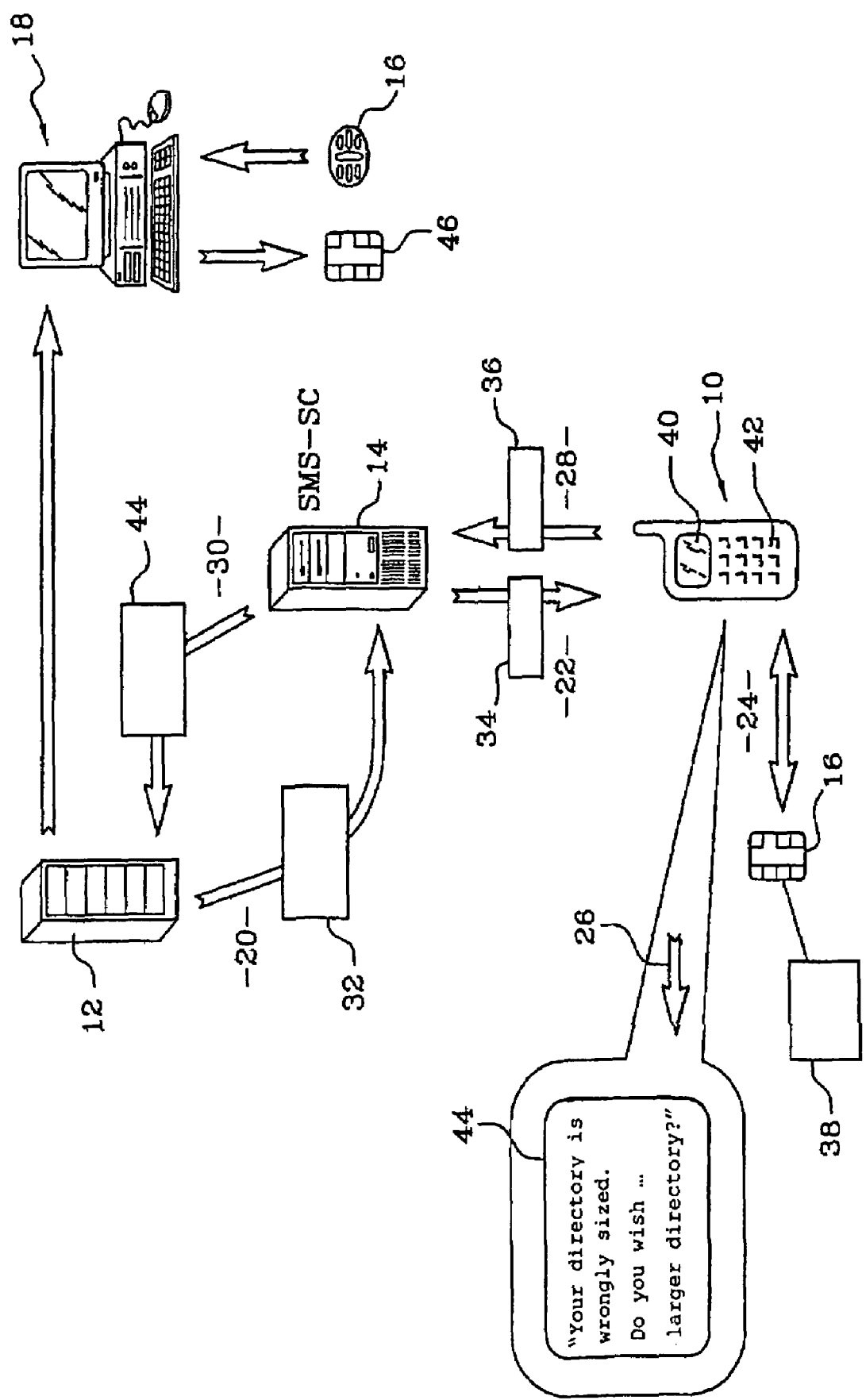

METHOD FOR DETECTION OF SATURATION OF FILES OR APPLICATIONS IN A SIM CARD FOR A MOBILE COMMUNICATION DEVICE

This disclosure is based upon French Application No. 01/07143, filed May 31, 2001, and International Application No. PCT/FR02/01857, filed on May 31, 2002, the contents of which are incorporated herein by reference.

BACKGROUND OF THE INVENTION

The invention concerns communication networks, in particular those of the GSM type, the acronym for the English expression "Global System for Mobile Communication", and more particularly in this field a method for detecting, in a communication apparatus connected to the communication network, the exceeding of a saturation threshold of one or more files or applications.

To a new subscriber to a communication network, for example of the GSM type, there is supplied a mobile communication apparatus containing an electronic smart card known by the expression "SIM card", SIM being the acronym of the English expression "Subscriber Identity Module". This SIM card is personalised so as to enable the subscriber to have access to various applications to which he has subscribed.

The present invention is intended for appliances containing a SIM card corresponding to the "SIM Toolkit phases 2 et seq" standard, and thus able to receive and send short so-called SMS (standing for "Short Message Service") messages.

Such a SIM card can contain the various data processing elements for implementing applications, mobile banking or games for example, and/or files for recording certain information such as a telephone directory or a collection of messages received.

As the mobile communication apparatus is used, the applications and files take up more and more space on the SIM card: this is because new applications or improved versions of existing applications are added, of larger size and more demanding in terms of memory resource, "results" data files are obtained issuing from larger and larger applications, and more and more directory data and SMS messages are stored.

Finally, a saturation threshold of the working memory of the particular applications or files is exceeded, which risks causing a problem for the user of the apparatus, and it is important to detect and indicate this state of affairs to him as soon as possible and to offer him at least one solution.

For reasons of simplicity, the terms "saturation" or "saturation threshold" will be used indifferently but under no circumstances should their interpretation be restricted solely to the detection of the full memory state.

SUMMARY OF THE INVENTION

One aim of the present invention is therefore a method for detecting, in a mobile communication apparatus, the saturation of a file or application and to transmit an alarm message to the user and/or to the operator of the network when the saturation is detected.

The invention therefore concerns a method of detecting saturation of files or applications in a mobile communication apparatus which can be connected to a remote management centre and to a message server, characterised in that it comprises the following main steps consisting of:

(a) detecting, for a given file or a given application contained in a SIM card, the fact that the space available is below a certain threshold, and (b) producing an alarm signal when this threshold is reached.

The method of the invention is implemented by an appropriate application which is loaded in the SIM card either at the time of delivery/personalisation, or remotely by the remote management centre via the message server.

The remote loading comprises the following steps:
the transmission by the management centre to the message server of a formatted request containing the application, and
the transmission from the message server to the mobile apparatus of the application in the SIM card.

Step (b) comprises the following steps consisting of:

($b_1$) presenting to the subscriber a text message or the like in order to indicate to him that the threshold is reached and that it is suggested that he should change his SIM card, and ($b_2$) transmitting the response of the subscriber to the proposal to the management centre via the message server.

The above steps are supplemented by:

($b_3$) transmitting from the management centre to the subscriber via the message server at least one message for proposing the sending of a new SIM card and/or going to a point of sale, and ($b_4$) transmitting the response of the subscriber to this proposal to the management centre via the message server.

BRIEF DESCRIPTION OF THE DRAWINGS

Other characteristics and advantages of the present invention will emerge from a reading of the following description of a particular example embodiment, the said description being given in relation to the accompanying drawing, in which:

the single FIGURE is a diagram illustrating the method according to the invention.

DETAILED DESCRIPTION

The invention will be described in its application to the detection of the saturation of a directory file in a mobile communication apparatus, this file also being known by the expression "ADN file", ADN being the acronym of the English expression "Abbreviated Dialling Number". This ADN file is contained in an electronic smart card SIM, this SIM card also containing a file of messages received from correspondents as well as applications to which memory paths are allocated for their use.

The invention then applies also to the detection of the saturation of the file of received messages or any other file and to the detection of saturation of the applications with regard to their associated memory parts.

A mobile communication apparatus 10 is connected to a communication network of the GSM type so as to be connected to another subscriber to the same network or another network. The subscribers to the network of the GSM type are managed by a platform at the management centre 12 which knows the characteristics of the mobile apparatus in the network and more particularly those of the SIM card of each subscriber.

The subscribers to the network communicate with each other essentially by a voice link but also by short messages which are managed by a server centre 14, referred to as the SMS-SC server, SMS-SC being the acronym of the English expression "Short Message Service—Service Centre". SMS means a short message of the text type and E-SMS, "Enhanced Short Message Service", a short message of the application type. This server 14 also serves to route short messages between the management centre 12 and any subscriber to a GSM network.

The method of the invention consists of two steps:
detecting in the SIM card of the subscriber 10 the passing by a file or an application of a filling threshold or a predetermined empty space threshold, and
transmitting an alarm centre to the management centre 12 when this predetermined threshold is reached.

Two solutions are proposed to implement this method:
the first by downloading an application for this purpose in the SIM card 16 of the apparatus 10 from the management centre 12 via the SMS-SC server 14, by means of a message of the E-SMS type, and
the second by recording the application on supply of the SIM card at a point of sale 18.

In the first solution, which is more particularly illustrated by the single FIGURE, the management unit 12 transmits (arrow 20) to the SMS-SC server 14 a formatted request 32 for loading the application according to the invention, which will be referred to as DETSAT, standing for detection of saturation. This application will be based on a method known to persons skilled in the art of examination of the state of the memory of a smart card.

The SMS-SC server 14 transforms this request into an E-SMS message 34 which is transmitted (arrow 22) to the mobile apparatus 10 designated by the formatted request 32.

On reception of this message 34, the application DETSAT is recorded (arrow 24) in the SIM card 16, which executes it.

This execution consists of analysing the ADN file 38 of the SIM card 16 in order to determine the number of locations available for call numbers. If the number of locations available is less than or equal for example to a threshold of five, the application warns the subscriber by means of a text message 44 on the screen 40 of the mobile apparatus 10 of the type:

"your directory is wrongly sized, Do you wish to replace your current SIM card with another SIM card with a larger directory?"

The response of the subscriber to this question by means of the keypad 42 of the mobile apparatus is transmitted (arrow 28) in the form of a short message 36 to the SMS-SC server 14, which retransmits it (arrow 30) to the management centre 12 in the form of a suitable message 44.

In the case of a positive response, the management centre 12 transmits to the mobile apparatus via the SMS-SC server 14 a message inviting the subscriber to go to a point of sale 18 in order to change SIM card, if necessary giving him addresses of these points of sale.

At the end of the execution of the DETSAT application, the latter is erased.

At the point of sale, the operator replaces the old SIM card 16 with the new card 46 into which he transferred the content of the ADN file 38 in a more extensive file of the new card 46.

This first solution of remote loading of the DETSAT application can be carried out in the case of SIM cards corresponding to the "SIM Toolkit, phases 2 et seq" standard. For example, it is suitable for SIM cards sold by the applicant under the brand name "GemXplore 98". This first solution has the advantage of reaching a large number of subscribers. In addition, it is simple to implement since a single E-SMS message can suffice to contain the DETSAT application.

In the second solution, the DETSAT application is loaded into the SIM card at the time of its supply to the subscriber. In this case, the DETSAT application is either launched autonomously according to predefined criteria, for example each time a new call number is entered in the ADN file 38 or simply periodically, or launched by an E-SMS message ordered by the management centre 12 according to a decision of the network operator.

In the case of detection of saturation, the steps of the method are the same for warning the management centre 12 via the SMS-SC server 14 by means of a message.

The management centre 12 uses this information in order for example to offer a new SIM card to the subscriber or to warn the point of sale 18.

This second solution has the advantage of causing little traffic on the network whilst functioning.

It applies to users having SIM cards according to the "SIM Toolkit phases 2 et seq" standard and for example those having SIM cards sold under the brand names "GemXplore 98" and "GemXplore Xpresso" of the applicant.

The two solutions can be combined, for example by loading the DETSAT application on personalisation and activating it by a message coming from the management centre 12 via the short message server 14.

This combination enables the management centre 12 to target subscribers without for all that substantially increasing the message traffic.

According to variants of the invention, the response message 36 of the subscriber can contain, in addition to his response, his personal details, the identity of the file which is saturated, the number of locations still available in the file etc.

Likewise, the final proposal by the network operator may be not a change of SIM card but a change to the parameters internal to the SIM card in order to personalise them. For example, if a subscriber uses the ADN file a great deal and the SMS message saving file only little, it is possible to suggest to him an increase in the memory dedicated to the ADN file and a decrease for the second file.

The invention claimed is:

1. A method of managing saturation of files or applications in a mobile communication apparatus which can be connected to a remote management centre and to a SMS-SC short message server, comprising the following steps:
    (a) detecting, for a given file or a given application contained in a SIM card, the fact that the space available is below a certain threshold,
    (b) when this threshold is reached, presenting to the subscriber a text message to indicate that the threshold has been reached and suggesting that an action be taken with respect to the SIM card, wherein said action is that the SIM card should be replaced;
    (c) transmitting a response of the subscriber to the management center via the short message server;
    (d) transmitting from the management centre to the subscriber, via the message server SMS-SC, at least one message proposing the sending of a new SIM card and/or going to a point of sale, and (e) transmitting the response of the subscriber to the management centre via the message server SMS-SC.

2. A method according to claim 1, wherein the method is implemented by an application which is loaded in the SIM card.

3. A method according to claim 2, wherein the application is loaded into the SIM card at the time of its supply or personalisation.

4. A method according to claim 2, wherein the application is loaded into the SIM card by the remote management centre via the SMS-SC short message server.

5. A method according to claim 4, wherein the loading of the application into the SIM card is performed in accordance with the following steps:

transmitting from the management centre to the short message server SMS-SC a formatted request containing the application, and transmitting the application from the short message server SMS-SC to the mobile communication apparatus by means of a message of the E-SMS type.

6. A method according to claim 1, wherein said text message includes a suggestion that the SIM card should be personalized.

7. A method according to claim 6, further comprising the step of modifying the memory locations dedicated to each file in the SIM card of the subscriber according to the subscriber's personal requirements.

* * * * *